US005245121A

United States Patent [19]

Gall et al.

[11] Patent Number: 5,245,121

[45] Date of Patent: Sep. 14, 1993

[54] REDUCED LEACHING OF HEAVY METALS FROM INCINERATOR ASHES

[75] Inventors: James W. Gall; Ollie G. Buck, both of Bartlesville; Dennis R. Kidd, Dewey, all of Okla.

[73] Assignee: Phillips Petroleum Company, Bartlesville, Okla.

[21] Appl. No.: 742,253

[22] Filed: Aug. 8, 1991

[51] Int. Cl.[5] ........................ C04B 2/02; C04B 14/08; C04B 18/04

[52] U.S. Cl. .................................... 588/257; 588/236; 588/252; 588/256; 588/901; 106/792; 106/793; 106/811; 501/155; 405/128

[58] Field of Search ................ 501/155; 106/705, 706, 106/784.02, DIG. 1, 623, 633, 453, 405, 811, 287.18; 423/DIG. 20; 100/697, 792, 794, 793, 803; 405/128

[56] References Cited

U.S. PATENT DOCUMENTS

| | | | |
|---|---|---|---|
| 3,352,009 | 11/1967 | Cohn et al. | 29/605 |
| 3,429,723 | 2/1969 | Maier et al. | 106/59 |
| 3,895,088 | 7/1975 | Goksel | 264/82 |
| 3,935,098 | 1/1976 | Oda et al. | 423/24 |
| 3,959,129 | 5/1976 | White et al. | 210/667 |
| 4,036,655 | 7/1977 | Yamada et al. | 106/77 |
| 4,134,858 | 1/1979 | Courty | 252/455 R |
| 4,152,287 | 5/1979 | Bjorklund et al. | 252/301.1 W |
| 4,432,666 | 2/1984 | Frey et al. | 405/129 |
| 4,518,508 | 5/1985 | Conner | 106/607 |
| 4,600,514 | 7/1986 | Conner | 106/615 |
| 4,615,643 | 10/1986 | Gouvenot | 106/632 |
| 4,661,291 | 4/1987 | Yamasaki et al. | 252/629 |
| 4,684,472 | 8/1987 | Abbe et al. | 210/720 |
| 4,687,373 | 8/1987 | Falk et al. | 106/612 |
| 4,751,208 | 6/1988 | Aoki et al. | 501/114 |
| 4,781,944 | 11/1988 | Jones | 427/228 |
| 4,872,993 | 10/1989 | Harrison | 210/667 |
| 4,988,376 | 1/1991 | Mason et al. | 501/27 |
| 5,037,286 | 8/1991 | Roberts | 425/222 |
| 5,041,398 | 8/1991 | Kanser et al. | 501/27 |
| 5,087,375 | 2/1992 | Weinwurm | 210/688 |

*Primary Examiner*—Mark L. Bell
*Assistant Examiner*—Michael A. Marcheschi
*Attorney, Agent, or Firm*—K. K. Brandes

[57] ABSTRACT

A waste material which contains chromium and/or lead impurities is treated by mixing the waste material with diatomaceous earth and/or sodium borate and then heating the mixture in a free oxygen containing gas at about 500°-1500° C., preferably in the presence of steam.

19 Claims, No Drawings

REDUCED LEACHING OF HEAVY METALS FROM INCINERATOR ASHES

BACKGROUND OF THE INVENTION

This invention relates to a method for alleviating leaching of chromium and/or lead compounds from incinerated waste materials.

Some waste materials contain heavy metals, in particular compounds of chromium or lead. Examples of such waste materials are spent olefin polymerization catalysts which contain chromium (generally in the +6 valence state) on inorganic support materials (such as silica). When these waste materials are burned in an incinerator, the formed ash frequently contains the chromium and/or lead impurities as water-soluble compounds. Thus, when the ash is disposed of in a landfill, the chromium and/or lead impurities can gradually leach from the ash and contaminate the ground water. The present invention is directed to alleviating the leaching of chromium and/or lead impurities from incinerated waste materials.

SUMMARY OF THE INVENTION

It is an object of this invention to provide a method for alleviating the leaching of chromium and/or lead compounds from incinerated waste materials. Other objects and advantages will become available from the detailed disclosure and the appended claims.

A process for treating a waste material which contains at least one heavy metal containing impurity selected from the group consisting of chromium metal, chromium compounds, lead metal and lead compounds comprises the steps of:

(a) mixing said waste material with at least one additive selected from the group consisting of diatomaceous earth and sodium borate, and (b) heating the mixture obtained in step (a) with a free oxygen containing gas at a temperature of about 500° to about 1500° C.

In one preferred embodiment, the waste material contains at least one combustible substance, and step (b) is carried out under such conditions as to substantially oxidize the combustible substance(s). In another preferred embodiment, step (b) is carried out in the presence of added steam. In a further preferred embodiment, step (a) is carried out with calcium hydroxide as an additional additive.

DETAILED DESCRIPTION OF THE INVENTION

Any suitable waste material which contains chromium metal and/or chromium compound(s) and/or lead metal and/or lead compound(s) can be employed in the process of this invention. Generally (but not necessarily), the waste material contains combustible (i.e., flammable) carbonaceous material(s). The waste material may be liquid or solid, preferably solid at 25° C./760 torr. Examples of suitable liquid waste materials are solutions from metal plating or fabric dying operations which contain chromium compounds, in particular chromium(VI) compounds. Other examples of liquid waste materials are discarded paint solutions which contain $PbSO_4$ or $Pb_3O_4$ or $PbCrO_4$ pigment particles. However, the process of this invention is particularly suited for treating solid wastes. Non-limiting examples of such solid wastes include spent olefin polymerization catalysts which contain chromium(VI) compound(s) on solid support materials such as $SiO_2$, $AlPO_4$, $Al_2O_3$, and the like. Other examples of solid waste materials are hardened paint materials which contain $PbSO_4$ or $Pb_3O_4$ or $PbCrO_4$ pigment particles, discarded lead storage batteries, metal shavings which contains Cr and/or Pb metal, and the like.

The liquid waste materials generally contain combustible organic liquids (e.g., liquid hydrocarbons, acetone, ethers, oils, and the like). The solid waste materials also generally contain combustible solid carbonaceous materials, such as carbon (coke), cellulosic materials (e.g., paper, cotton fabric, wood), polymeric materials (e.g., polyethylene, polypropylene, polyesters, and the like), various other organic materials (e.g., polycyclic aromatic hydrocarbons and derivatives thereof, organometallic compounds, solid carboxylic acids and the like). The source of the waste materials is not considered critical, as long as they contain Cr and/or Pb as impurities and justify the heating step (b), in particular because of the presence of combustible materials in the waste material.

The mixing of the waste material and of the additive(s) in step (a) of the process of this invention can be carried out in any suitable manner. Generally, a conventional mixing operation employing a rotary mixing vessel, or an auger, or a static mixer, or a mixer equipped with a rotatable stirrer and the like is employed. The choice of the particular mixing equipment depends on the consistency and viscosity of the waste material and on economic considerations and can easily be made by one skilled in the art.

In one particular embodiment of step (a), diatomaceous earth (also referred to as kieselguhr or diatomite) is added to the waste material. Diatomaceous earth is a naturally occurring material which generally contains about 80–90 weight percent silica, and is described in various publications, such as Kirk-Othmer Encyclopedia of Chemical Technology, Volume 7, pages 603–613 (1979). Diatomaceous earth generally also contains about 3–5 weight percent $Al_2O_3$, about 1–2 weight percent $Fe_2O_3$, about 0.5–3 weight percent CaO, about 0.5–2 weight percent $Na_2O$, about 0.1–1 weight percent MgO, about 0.1–1 weight percent $TiO_2$, about 0.1–1 weight percent $V_2O_5$, and about 2–10 weight percent chemically bound water. The true specific gravity of diatomaceous earth is about 2.1–2.2, while the apparent density of diatomaceous earth can vary from 0.1–0.3 $g/cm^3$ (for powders) to about 0.9–1.0 $g/cm^3$ (for lump material). The weight ratio of added diatomite (dry) to Cr or Pb or (Cr+Pb), expressed as Cr and/or Pb element(s), contained in the waste material is generally in the range of about 20:1 to about 200:1, preferably about 40:1 to about 120:1.

In another particular embodiment of step (a), at least one sodium borate is added to the waste material. Sodium borates are well known materials and are described in various publications, such as Kirk-Othmer Encyclopedia of Chemical Technology, Volume 4, pages 80–99 (1978). Non-limiting examples of sodium borates are anhydrous $Na_2B_4O_7$, $Na_2B_4O_7.4H_2O$, $Na_2B_4O_7.5H_2O$, $Na_2B_4O_7.10H_2O$, $Na_2B_8O_{13}.4H_2O$, $Na_2B_{10}O_{16}.10H_2O$ and $NaBO_2.4H_2O$. The most common sodium borate is borax, $Na_2B_4O_7$, preferably the decahydrate. When sodium borate is added to the waste material, the weight ratio of the sodium borate (including crystal water if present) to Cr or Pb or (Cr+Pb), expressed as Cr and/or Pb element(s), contained in the waste material generally is in the range of about 1:1 to about 30:1, preferably about 3:1 to about 10:1. It is within the scope of this invention to add both diatomaceous earth and sodium borate to the waste material, at the weight ratios recited above.

In a further embodiment of this invention, calcium hydroxide is also added to the waste material in step (a), either in addition to diatomaceous earth or sodium borate or both. The calcium hydroxide can be added as $Ca(OH)_2$ powder or as an aqueous paste (known as slaked lime). When added, the weight ratio of $Ca(OH)_2$ to Cr or Pb or (Cr+Pb), expressed as Cr and/or Pb element(s) generally is in the range of about 0.5:1 to about 15:1.

Any suitable operating conditions can be employed in incineration step (b). Generally, the temperature in step (b) is about 500° C. to about 1500° C., preferably about 700°-900° C. The residence time of the material to be incinerated in step (b) generally is at least about 0.5 minute, preferably about 1 minute to about 5 hours, more preferably about 20 to about 120 minutes. The injected oxygen-containing gas can be pure $O_2$ or air or $N_2$-diluted air or $O_2$-enriched air. Treating step (b) can be carried out in any suitable furnace or incinerator, such as those described in U.S. Pat. Nos. 4,424,755, 4,395,958, 3,589,313 and 3,596,614, and in a June 1981 report of the U.S. Environmental Protection Agency, authored by T. A. Bonner et al., entitled "Engineering Handbook for Hazardous Waste Incineration". The most common incinerators are rotary kilns, fluidized bed incinerators, multiple hearth incinerators and liquid injection incinerators. These incinerators may be equipped with suitable feeder/shredder equipment, air compressor/injection equipment, afterburner chambers, waste gas treating equipment (e.g., scrubbers for removing $SO_x$ and $NO_x$), process control systems, and the like. Those skilled in the art will choose the most suitable incinerator system for a particular waste material.

The feed rate of the free oxygen-containing gas depends on the feed rate of the material obtained in step (a) and on the amount of combustibles which may be present in this material. In a particularly preferred mode of step (b), steam is also added (together with the oxygen containing gas). This is particularly desirable when little water vapor is formed in the oxidative heating step (b), i.e., when the waste material to be incinerated does not contain a significant amount of hydrogen-containing compounds (such as hydrocarbons, cellulosic materials, organic polymers, etc.) and generates only a small amount of water vapor as oxidation product. When steam is added, generally the volume ratio of added steam to free oxygen (contained in the free oxygen-containing gas) is about 0.1:1 to about 2:1, preferably about 0.3:1 to about 1:1.

The ash, i.e., the solid residue which is formed in heating/incinerating step (b), should pass "EP Toxic Test FR 45 33 127, May 19, 1980" of the U.S. Environmental Protection Agency, described in Example I of this application. When treated according to this leaching test, the amount of chromium which has leached from the ash should not exceed 5 ppm Cr in the leaching test solution (i.e., 5 parts by weight of Cr per million parts by weight of the leaching test solution), and the amount of lead which has leached from the ash should not exceed 5 ppm Pb in the leaching test solution (i.e., 5 parts by weight of Pb per billion parts by weight of the leaching solution). Generally, the amount of leached Cr and Pb, respectively, in the EPA test solution is in the range of about 0.1 to about 4 ppm Cr and about 0.1 to about 1 ppm Pb. The ash can then be disposed of in any suitable and safe manner, such as in sanitary landfills.

The following examples are presented to further illustrate the invention and are not to be considered unduly limiting the scope of this invention.

EXAMPLE I

This example illustrates the procedure of a test of the U.S. Environmental Protection Agency for simulating the leaching of toxic substances from solid waste materials in sanitary landfills. This test, which has been published as EP Toxicity test FR 45 33 127, May 19, 1980, is used in subsequent examples for assessing the leachability of Cr compounds and Pb compounds from the ash of incinerated waste materials.

Prior to extraction, the solid waste material must pass through a 9.5-mm (0.375-inch) standard sieve, and have a surface area of 3.1 $cm^2$ per gram of waste. The sieved solid waste material is then extracted for 24 hours in an aqueous medium the pH of which is maintained at or below 5 using 0.5N acetic acid. The pH is maintained either automatically or manually. In acidifying to pH 5, no more than 4.0 g of the acid solution per g of material being extracted may be used.

For purposes of this extraction test, an acceptable extractor is one that will impart sufficient agitation to the mixture to (1) prevent stratification of the sample and extraction fluid and (2) ensure that all sample surfaces are continuously brought into contact with well-mixed extraction fluid. Suitable extractors are available from Associated Designs & Manufacturing Co., Alexandria, Va.; Kraft Apparatus Inc., Mineola, N.Y.; Millipore, Bedford, Mass.; and Rexnard, Milwaukee, Wis.

After extraction, the liquid:solid weight ratio is adjusted to 20:1, and the mixed solid and extraction liquid are separated by filtration through a 0.45 micron filter membrane. The solid is discarded, and the liquid extract is analyzed for Cr and Pb by plasma emission spectrometry.

A solid waste material passes the above-described EPA test if the liquid extract contains no more than 5.0 mg Cr per liter of the liquid extract and no more than 5.0 mg Pb per liter of the liquid extract, i.e., no more than 5 ppm Cr and no more than 5 ppm Pb. A solid waste material, such as an ash from an incinerator, which passes this test is considered safe for disposal in sanitary landfills.

EXAMPLE II

This example illustrates the reduction of chromium and lead leaching from incinerated materials by the presence of diatomaceous earth during a simulated incineration.

About 1.5 g technical grade lead oxide (PbO) was mixed with about 110 g of Celite Filter-Cel diatomite, a commercial diatomaceous earth, marketed by Johns-Manville Corporation, Denver, Colo. In a control test, this solid mixture was subjected to the EPA leaching test described in Example I: the aqueous leachate contained about 1.0 weight-% Pb and about 0.1 weight-% Cr.

In invention runs, the above-described PbO/Celite mixture was placed in a stainless steel pan and heated in a muffle furnace under a $N_2/O_2$ atmosphere containing 12 weight-% $O_2$ for 90 minutes at 1100°-1500° F. The mixture was stirred during heating at 10-15 minute intervals so as to simulate a rotary kiln operation. The thus-heated mixture was cooled to room temperature and subjected to the EPA leaching test described in Example I. Test results are summarized below:

TABLE I

| Run | Furnace Temp. (°F.) | ppm Metal in Leachate Pb | ppm Metal in Leachate Cr |
|---|---|---|---|
| Control Run | not heated | ~9900* | ~140* |
| Invention Run 1 | 1100 | 1.2 | <0.1 |
| Invention Run 2 | 1500 | <0.7 | 0.2 |
| Invention Run 3 | 1500 | <0.7 | <0.1 |

*average of 3 analyses

Test results in Table I clearly indicate that Cr- and Pb-containing waste materials can be incinerated at 1100°-1500° F. (593°-816° C.) in admixture with diatomaceous earth so as to yield ashes which will pass the EPA leaching test described in Example I and will be safe for disposal in sanitary landfills.

EXAMPLE III

This example illustrates the reduction of chromium and lead leaching by the presence of diatomaceous earth and sodium borate during a simulated incineration.

A sample of 100 g of a $CrO_x/SiO_2$ (wherein x is 2-3) ethylene polymerization waste catalyst (containing about 1.0 g Cr) and 1.1 g PbO (containing about 1.0 g Pb) was mixed with 100 g Celite diatomaceous earth and 10 g $Na_2B_4O_7$. One portion of the obtained mixture was subjected to the EPA leaching test described in Example I. The aqueous leachate contained 3,720 ppm Cr and 4,310 ppm Pb. Another portion of the above-described mixture was heated in a muffle furnace with a free oxygen containing as for 90 minutes at 1500° F., substantially as described in Example II. The thus-heated sample (labeled Run 4) was allowed to cool to room temperature and was subjected to the EPA leaching test of Example I. Result: the aqueous leachate contained 3.4 ppm Cr and less than 0.7 ppm Pb, and thus passed the EPA test.

EXAMPLE IV

This example illustrates the simulated incineration of Pb- and Cr-containing materials in the presence of steam.

A rotable quartz flask (length: 12 inches; diameter: 3 inches) equipped with stainless metal inlet tubes for water and air, was used as a simulated rotary kiln incinerator. In each test, enough of a mixture containing PbO and/or $CrO_x/SiO_2$ (with x being 2-3) and at least one additive was added to the flask to fill about 25-33% of the flask volume. The flask with content was placed into a hot furnace and then heated for about 90 minutes at the desired incineration temperature (1100°-1500° F.) while the flask was slowly rotated. Air was introduced at a rate of 5 cc/minute, and water was added at a rate of 6 cc/hour. The following solid feed mixture were prepared and used in simulated incineration tests with steam:

Run 5: 0.65 g PbO, 60.0 g $CrO_x/SiO_2$ waste polymerization catalyst (containing 0.5 weight-% Cr) and 59.35 g Celite diatomite.

Run 6: 0.65 g PbO, 60.0 g $CrO_x/SiO_2$ waste catalyst, 59.35 g Celite diatomite and 6.0 g $Na_2B_2O_7 \cdot 10H_2O$ (borax).

Run 7: 60 g $CrO_x/SiO_2$ waste catalyst and 60.0 g Celite diatomite.

Run 8: 80 g $CrO_x/SiO_2$, 40 g Celite diatomite and 4 g $Ca(OH)_2$.

Run 9: 120 g $CrO_x/SiO_2$ waste catalyst and 12.0 $Na_2B_4O_7 \cdot 10H_2O$.

Runs 10 and 11: 1.5 g PbO and 112.0 g Celite diatomite.

Each of the above-described mixtures of Runs 6-12 was subjected to the EPA test described in Example I after heating for 90 minutes at 1100°-1500° F. in the presence of steam. Test results are summarized in Table II.

TABLE II

| Run | ppm Metal in Feed Mixture Before Heating Cr | ppm Metal in Feed Mixture Before Heating Pb | Furnace Temp. (°F.) | Steam Present | ppm Metal in Leachate After Heating Cr | ppm Metal in Leachate After Heating Pb |
|---|---|---|---|---|---|---|
| 5 | 500 | 500 | 1500 | Yes | 1.3 | <0.7 |
| 6 | 500 | 500 | 1500 | Yes | <0.1 | 0.7 |
| 7 | 1000 | — | 1500 | Yes | 3.1 | — |
| 8 | 750 | — | 1200 | Yes | 0.6 | — |
| 9 | 1000 | — | 1500 | Yes | 3.3 | — |
| 10 | — | 1000 | 1500 | Yes | — | <0.7 |
| 11 | — | 1000 | 1100 | Yes | — | <0.7 |

Test data in Table II indicate that all runs produced an "ash" which passed the EPA leaching test. A comparison of the result of Run 6 (with steam, diatomaceous earth and sodium borate additives) with the results of Run 4 of Example III (without steam, diatomaceous earth and sodium borate additives) revealed the very beneficial effect of steam on Cr leaching (less than 0.1 ppm Cr in Run 6 versus 3.4 ppm Cr in Run 4). A comparison of the results of Run 11 (with steam, diatomaceous earth additive, 1100° C.) and of Run 1 in Example II (without steam, diatomaceous earth additive, 1100° C.) indicates a beneficial effect of steam on Pb leaching (less than 0.7 ppm Pb in Run 11 versus 1.2 ppm Pb in Run 1).

A comparison of test results of Runs 5 and 6 reveals the beneficial effect of sodium borate in conjunction with diatomaceous earth on Cr leaching. Sodium borate alone was approximately as effective as diatomaceous earth alone in alleviating Cr leaching (Run 9 vs. Run 7). A comparison of test results of Runs 7 and 8 reveals the beneficial effect of $Ca(OH)_2$, in conjunction with diatomaceous earth, on Cr leaching.

Reasonable variations and modifications are possible within the scope of the disclosure of the invention and the appended claims.

That which is claimed is:

1. A process for treating a waste material which contains at least one heavy metal containing impurity selected from the group consisting of chromium metal and chromium compounds comprising the steps of
   (a) mixing said waste material with an additive consisting essentially of diatomaceous earth and calcium hydroxide; and
   (b) heating the mixture obtained in step (a) with a free oxygen containing gas at a temperature of about 500° to about 1500° C.

2. A process in accordance with claim 1, wherein said waste material additionally contains at least one combustible carbonaceous material.

3. A process in accordance with claim 1, wherein said waste material is solid and said at least one heavy metal impurity is at least one chromium compound.

4. A process in accordance with claim 1, wherein the weight ratio of said diatomaceous earth to said at least one heavy metal, expressed as elemental metal, contained in said waste material is in the range of about 20:1 to about 200:1, and the weight ratio of said calcium hydroxide to said at least one heavy metal, expressed as elemental metal, contained in said waste material is in the range of about 0.5:1 to about 15:1.

5. A process in accordance with claim 1, wherein step (b) of said process is carried out for at least about 0.5 minute.

6. A process in accordance with claim 1, wherein step (b) of said process is carried out at a temperature in the range of about 700° C. to about 900° C.

7. A process in accordance with claim 6, wherein step (b) of said process is carried out for about 20 minutes to about 120 minutes.

8. A process in accordance with claim 1, wherein said free oxygen containing gas is air.

9. A process in accordance with claim 1, further comprising the step of disposing the solid residue obtained in step (b) in a landfill.

10. A process for treating a waste material which contains at least one heavy metal containing impurity selected from the group consisting of chromium metal and chromium compounds comprising the steps of (a) mixing said waste material with an additive consisting essentially of diatomaceous earth and calcium hydroxide, and (b) heating the mixture obtained in step (a) with a free oxygen containing gas and added steam at a temperature of about 500° to about 1500° C.

11. A process in accordance with claim 10, wherein said waste material additionally contains at least one combustible carbonaceous material.

12. A process in accordance with claim 10, wherein said waste material is solid and said at least one heavy metal impurity is at least one chromium compound.

13. A process in accordance with claim 10, wherein the weight ratio of said diatomaceous earth to said at least one heavy metal, expressed as elemental metal, contained in said waste material is in the range of about 20:1 to about 200:1, and the weight ratio of said calcium hydroxide to said at least one heavy metal, expressed as elemental metal, contained in said waste material is in the range of about 0.5:1 to about 15:1.

14. A process in accordance with claim 10, wherein step (b) of said process is carried out for at least about 0.5 minute.

15. A process in accordance with claim 10, wherein step (b) of said process is carried out at a temperature in the range of about 700° C. to about 900° C.

16. A process in accordance with claim 15, wherein step of said process is carried out for about 20 minutes to about 120 minutes.

17. A process in accordance with claim 10, wherein the volume ratio of said added steam to oxygen contained in said free oxygen containing gas is in the range of about 0.1:1 to about 2:1.

18. A process in accordance with claim 10, wherein said free oxygen containing gas is air.

19. A process in accordance with claim 10, further comprising the step of disposing the solid residue obtained in step (b) in a landfill.

* * * * *